United States Patent
Müller et al.

(10) Patent No.: US 12,085,101 B2
(45) Date of Patent: Sep. 10, 2024

(54) CYLINDER DEVICE FOR A HYDRAULIC LIFTING DEVICE WITH DISTANCE MEASUREMENT, HYDRAULIC LIFTING DEVICE, CHASSIS AND MOBILE DEVICE

(71) Applicant: HAWE Hydraulik SE, Aschheim (DE)

(72) Inventors: Sven Müller, Rohr In Niederbayern (DE); Alexander Ahle, Worth An Der Donau (DE); Martin Resch, Sunching (DE)

(73) Assignee: HAWE Hydraulik SE, Aschheim (DE)

( * ) Notice: Subject to any disclaimer, the term of this patent is extended or adjusted under 35 U.S.C. 154(b) by 188 days.

(21) Appl. No.: 17/386,670

(22) Filed: Jul. 28, 2021

(65) Prior Publication Data
US 2022/0031544 A1 Feb. 3, 2022

(30) Foreign Application Priority Data

Jul. 29, 2020 (DE) .......................... 102020209578.7

(51) Int. Cl.
*F15B 15/20* (2006.01)
*A61G 7/018* (2006.01)
(Continued)

(52) U.S. Cl.
CPC .............. *F15B 15/20* (2013.01); *A61G 7/018* (2013.01); *F15B 15/1457* (2013.01); *F15B 15/2815* (2013.01); *F15B 15/2823* (2013.01); *A61G 13/06* (2013.01); *A61G 13/104* (2013.01); *A61G 2203/70* (2013.01); *B60B 33/06* (2013.01);
(Continued)

(58) Field of Classification Search
CPC .. F15B 15/2815; F15B 15/20; F15B 15/2823; F15B 15/1457; A61G 7/018; B60B 33/06
See application file for complete search history.

(56) References Cited

U.S. PATENT DOCUMENTS 3,915,070 A * 10/1975 Mailliet .............. F15B 15/2823
92/33
4,381,507 A * 4/1983 Parmer .................... G01D 5/04
340/870.38

(Continued)

FOREIGN PATENT DOCUMENTS

DE 4003151 C1 9/1991
DE 102012001555 A1 8/2013
(Continued)

*Primary Examiner* — Dustin T Nguyen
(74) *Attorney, Agent, or Firm* — DINSMORE & SHOHL LLP

(57) ABSTRACT

A cylinder device for a hydraulic lifting device has a housing and a piston rod axially movable relative to the housing. A rotary element is mounted on the housing in such a way that a rotary movement of the rotary element relative to the housing is possible and an axial movement of the rotary element relative to the housing is prevented. The piston rod has a movement transmission element, wherein the movement transmission element translates an axial movement of the piston rod into a rotary movement of the rotary element. A sensor unit is attached to the housing, which detects the rotary movement of the rotary element. Furthermore, a hydraulic lifting device with such a cylinder device, a chassis of a mobile device with a lifting device and a mobile device with a chassis are provided.

10 Claims, 3 Drawing Sheets

(51) Int. Cl.
*F15B 15/14* (2006.01)
*F15B 15/28* (2006.01)
*A61G 13/06* (2006.01)
*A61G 13/10* (2006.01)
*B60B 33/06* (2006.01)
*F15B 19/00* (2006.01)

(52) U.S. Cl.
CPC ....... *F15B 15/1447* (2013.01); *F15B 15/1466* (2013.01); *F15B 2015/1495* (2013.01); *F15B 19/00* (2013.01)

(56) References Cited

U.S. PATENT DOCUMENTS

| | | | | |
|---|---|---|---|---|
| 4,543,649 | A * | 9/1985 | Head | G01S 7/52006 367/902 |
| 4,671,728 | A * | 6/1987 | Clark | A61B 6/102 414/284 |
| 4,932,311 | A * | 6/1990 | Mibu | G05B 19/232 92/33 |
| 5,144,275 | A * | 9/1992 | Sebastian | F15B 15/28 338/180 |
| 5,220,698 | A * | 6/1993 | Hannant | A61G 13/02 5/424 |
| 7,512,460 | B2 * | 3/2009 | Strosser | F15B 19/002 73/1.72 |
| 7,956,606 | B2 * | 6/2011 | Burt | G01D 11/02 324/207.16 |
| 9,341,266 | B1 * | 5/2016 | Vivatson | F16J 10/02 |
| 9,347,763 | B2 * | 5/2016 | Ikegami | G01B 7/003 |
| 9,568,029 | B2 * | 2/2017 | Lemke | B66F 3/46 |
| 9,658,626 | B2 * | 5/2017 | Rannow | G05D 16/20 |
| 10,813,808 | B2 * | 10/2020 | Fiedler | A61G 13/104 |
| 11,168,716 | B2 * | 11/2021 | Yasui | F15B 15/2838 |
| 11,730,650 | B2 * | 8/2023 | Mansfield | A61G 7/1073 5/611 |
| 2020/0000663 | A1 | 1/2020 | Fiedler | |
| 2021/0353478 | A1 * | 11/2021 | Heneveld, Jr. | A61G 7/012 |
| 2022/0243746 | A1 * | 8/2022 | Smith | F15B 15/2838 |

FOREIGN PATENT DOCUMENTS

| | | |
|---|---|---|
| DE | 102017103050 A1 | 8/2018 |
| JP | S4813828 Y1 | 4/1973 |
| JP | S5512574 Y2 | 3/1980 |
| JP | S594169 Y2 | 2/1984 |
| JP | H01092505 U | 6/1989 |
| JP | 2563528 Y2 | 2/1998 |
| KR | 102011132 B1 | 8/2019 |

* cited by examiner

CYLINDER DEVICE FOR A HYDRAULIC LIFTING DEVICE WITH DISTANCE MEASUREMENT, HYDRAULIC LIFTING DEVICE, CHASSIS AND MOBILE DEVICE

CROSS-REFERENCE TO RELATED APPLICATIONS

This Application claims priority from Application 102020209578.7 filed on Jul. 29, 2020 in Germany, which is incorporated herein in its entirety by reference.

FIELD OF THE INVENTION

The present invention relates to a cylinder device for a hydraulic lifting device, a hydraulic lifting device with such a cylinder device, a chassis with a hydraulic lifting device, and a mobile device with a chassis. The mobile device may in particular be a mobile medical device.

BACKGROUND OF THE INVENTION

Chassis for such mobile devices are known from the prior art. For use in particular on mobile medical devices, for example on surgical robots or operating tables, special requirements are placed on the chassis. During use, they must be firmly fixed, supported and levelled, regardless of the ground. Hydraulic lifting devices on the chassis, also known as "floor lock" systems, serve this purpose, as shown for example in DE 10 2012 001 555 A1.

As a rule, a cylinder device for a hydraulic lifting device is arranged on each castor of the chassis or is assigned to this castor. By pressing a pedal, usually manually, hydraulic fluid is pressed from a reservoir via a conduct system into the cylinder devices, causing them to extend vertically downwards. The chassis is supported on the ground by support feet that are attached to the piston rods of the cylinder devices. A central valve, operatively coupled to the pedal, prevents the pressure medium from flowing back into the reservoir and thus a loss of pressure in the cylinder devices. Systems are also known in which a power unit supplies the cylinder devices with hydraulic fluid.

With such hydraulic systems, a gradual loss of pressure can occur over time, for example due to dirt on a non-return valve or load-holding valve. Due to this pressure loss, the chassis slowly lowers and, in the worst case, the castors can come into contact with the ground and thus cause the chassis to move.

DE 10 2012 001 555 A1 therefore additionally proposes a mechanically actuated brake foot that is intended to brake the chassis and fix it in place even in the event of malfunctions of the hydraulic system.

However, the additional securing with a mechanically operated brake foot has the disadvantage that it can only intervene when the pressure loss of the system is already so great that the chassis has already been lowered or the cylinder device has already partially retracted. The chassis is then at most secured by the brake foot against undesired rolling away. Firm support and levelling, as required for medical treatment, for example, are then no longer guaranteed.

In order to detect pressure fluctuations even before the possible lowering of the chassis, there is the possibility of sensor monitoring of the hydraulic pressure in the cylinder devices. However, in addition to major malfunctions of the hydraulic system, wear-related small leaks in the valves, temperature fluctuations or weight shifts in the medical devices can also lead to certain pressure fluctuations.

The disadvantage of sensor monitoring of the hydraulic pressure of the cylinder device is that it is not possible to distinguish which cause the pressure differences are due to and therefore it is also not possible to recognize whether there is a risk of the device retracting. Therefore, as soon as a certain pressure fluctuation occurs, a reaction such as an alarm or stopping of the application is triggered without ensuring that this is really necessary because there is a risk of the device retracting. This regularly leads to false alarms or unnecessary application stops.

SUMMARY OF THE INVENTION

Based on this, it is the object of the present invention to provide a cylinder device for a hydraulic lifting device of a chassis, with which an unintentional lowering of the chassis can be reliably detected at an early stage without requiring additional installation space.

This problem is solved by a cylinder device for a hydraulic lifting device as disclosed herein. Preferable further embodiment are also disclosed.

The cylinder device according to the invention comprises a housing and a piston rod. The piston rod is axially movable relative to the housing. The invention is distinguished from the prior art in particular in that the cylinder device further comprises a rotary element, a movement transmission element and a sensor unit. The rotary element is disposed in the housing in such a way that a rotary movement of the rotary element relative to the housing is possible and an axial movement of the rotary element relative to the housing is prevented. The movement transmission element is arranged on the piston rod and translates the axial movement of the piston rod into a rotary movement of the rotary element. The sensor unit is attached to the housing and detects the rotary movement of the rotary element.

Axial movement in this context is to be understood as a linear movement in the axial direction along the longitudinal axis of the cylinder device.

The rotary movement of the rotary element can thus be converted into the distance travelled by the piston rod. For this purpose, the rotary movement of the rotary element is translated into a rotary increment, which is detected by the sensor unit via an encoder. Through this distance measurement, a lowering of the chassis can be detected at an early stage, independent of the pressure. In this way, compliance with tolerances for the lowering distance of the chassis can be precisely monitored. Depending on the application, this tolerance can, for example, be less than 1 mm or even go so far that only complete lowering, i.e. contact of the castors with the ground, should be indicated. Another advantage of the invention is that the additional elements for distance measurement can be completely integrated within the cylinder device. This means that no additional installation space is required.

Preferably, the housing comprises a cylinder head and the sensor unit is disposed in the cylinder head. This allows the sensor unit to be protected from oil and to be accommodated favorably in terms of installation space. In addition, the signal transmission of the sensor unit's signal can be carried out in a constructionally favorable manner.

Preferably, the movement transmission element is disposed inside the piston rod. In particular, it is advantageous if the rotary element projects into a cavity of the piston rod. In this way, other components of the cylinder device are less affected and no additional installation space is required.

Preferably, the rotary element and the movement transmission element have meshing threads. In this regard, it is particularly preferably if the rotary element is a threaded spindle and/or the movement transmission element is a threaded nut. This enables a simple and reliable translation of the axial movement of the piston rod into the rotary movement of the rotary element. In addition, the travelled distance of the piston rod can be easily calculated via the thread pitch. Furthermore, this makes it possible to design the components simply and robustly against high pressure and mechanical load.

Preferably, the sensor unit can be digital or analogue. This enables a reliable recording of the measured values.

Preferably, the rotary element is connected to the sensor unit via a bearing mandrel. The bearing mandrel further transmits the rotary movement of the rotary element to the sensor unit. This allows the cylinder device to be divided into a pressurized portion and an unpressurised portion. The two portions can be sealed off from each other, for example via suitable sealing arrangements. The sensitive sensor unit can thus be protected from pressure. Furthermore, the bearing mandrel improves the stability of the rotary element during movement and prevents axial movement of the rotary element.

Preferably, the rotary element and the bearing mandrel are supported via a ball bearing. This enables a low-friction, robust and durable support of the rotating parts. In addition, installation space and costs can be saved, as only one bearing is required for all rotating parts.

The solution of the problem is further achieved with a hydraulic lifting device which comprises a cylinder device according to the invention as described above. Furthermore, the solution of the problem is achieved with a chassis according to which comprises such a hydraulic lifting device, as well as with a mobile device according which comprises such a chassis. The mobile device can in particular be a mobile medical device or a mobile medical appliance.

BRIEF DESCRIPTION OF THE DRAWINGS

The invention is explained in more detail below using an example of an embodiment shown in the figures.

DETAILED DESCRIPTION OF THE INVENTION

Figure 1:
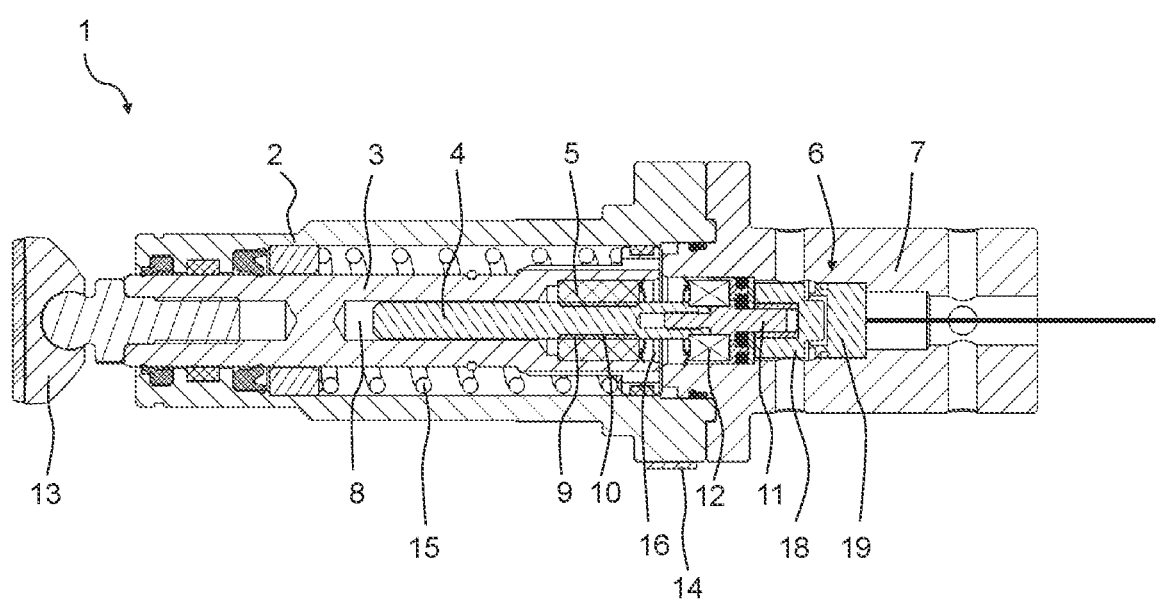
FIG. 1 is a schematic cross sectional view taken along the longitudinal axis of a cylinder device according to the invention.
Figure 2:
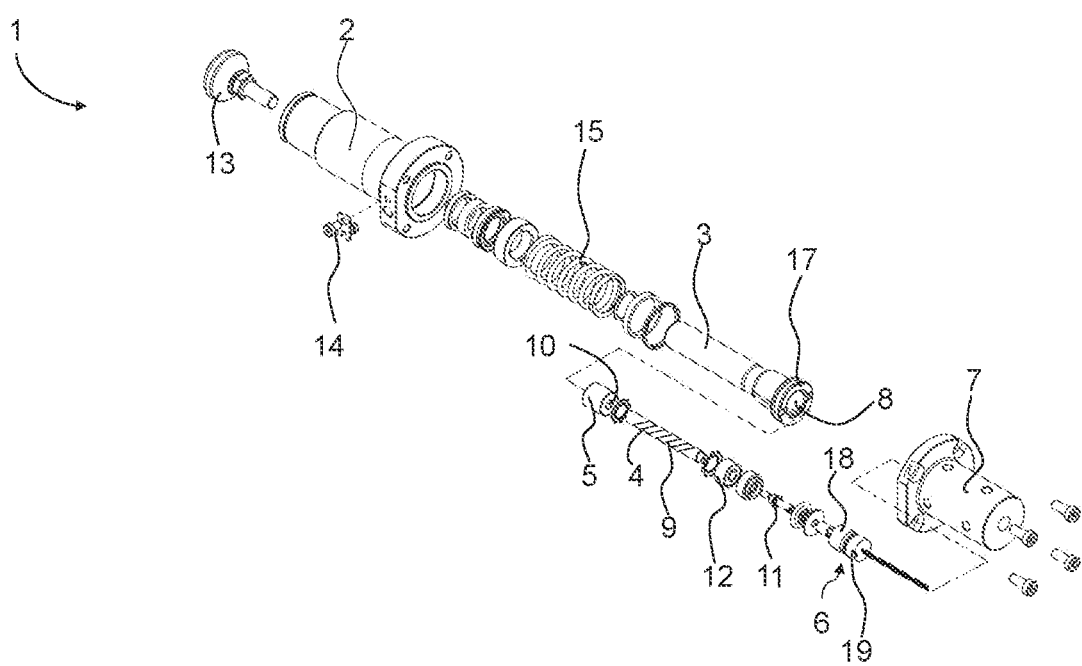
FIG. 2 is an exploded view of a cylinder device according to the invention.

As shown in FIG. 1 and FIG. 2, a cylinder device 1 comprises a support foot 13, a housing 2, a piston rod 3 and a cylinder head 7.

Figure 3:
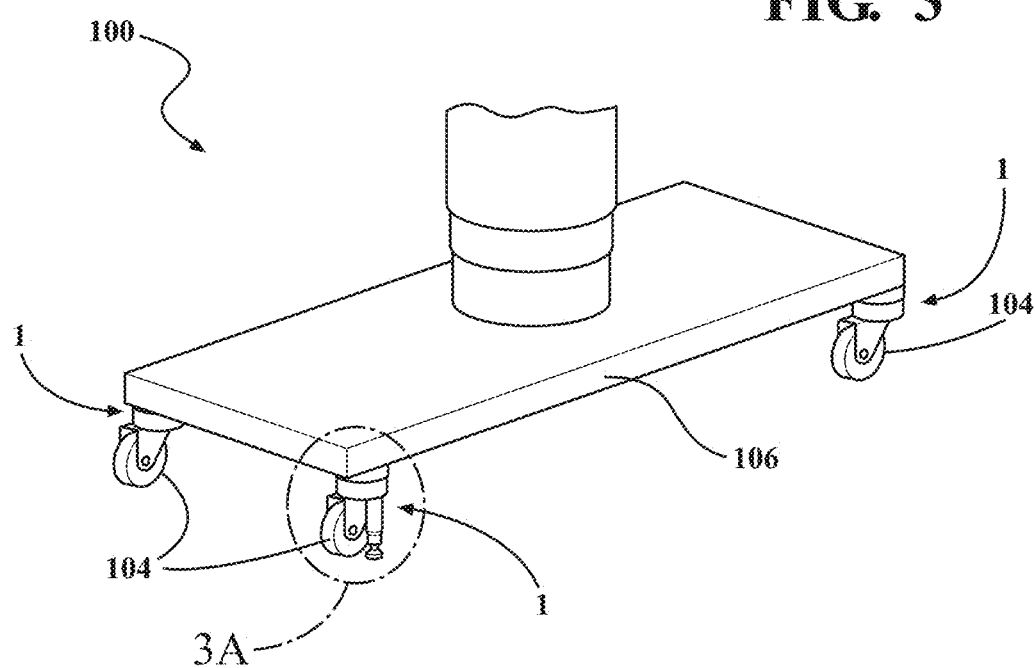
FIG. 3 is a schematic view of a mobile medical device according to the invention.
Figure 3A:
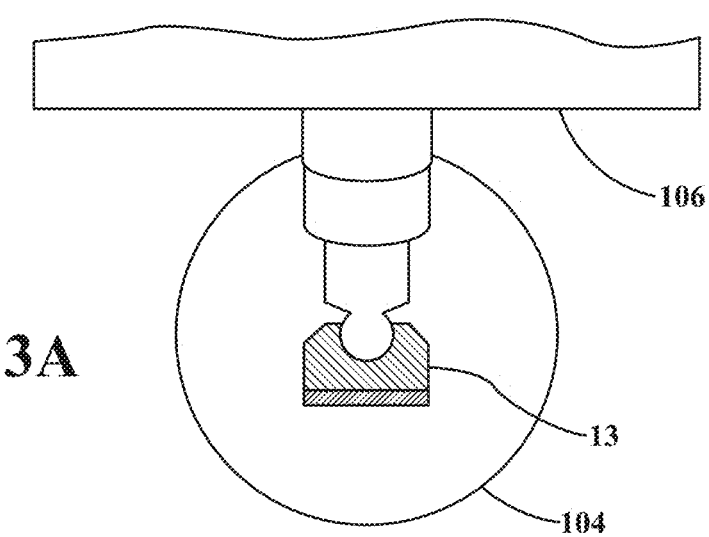
FIG. 3A is an enlarged view of 3A in FIG. 1.

If such cylinder devices 1 are used in a lifting device for a chassis of a mobile device, usually several (namely regularly four) such cylinder devices 1 are used. FIG. 3 shows a mobile medical device 100 with a chassis 106, castors 104 and a cylinder device 1 between the chassis and each of the castors. The installation of the cylinder device 1 on the chassis of a mobile device is usually carried out in such a way that the end at the cylinder head of the cylinder device 1 points upwards. Consequently, the end of the cylinder device 1 on the support foot 13 side points downwards, i.e. towards the ground. Often the cylinder devices 1 are mounted in the vicinity of castors of the chassis or are directly integrated into the castors. Such a mobile device can in particular be a medical device, for example a surgical robot.

As can be seen in FIGS. 1 and 2, the upper end of the housing 2 is connected to the cylinder head 7. The cylinder head 7 can be attached to the housing 2 by screws, for example. The piston rod 3 is arranged inside the housing 2. The piston rod 3 is axially movable relative to the housing 2, i.e. it can be extended and retracted by applying pressure. The lower end of the piston rod 3 is hinged to the support foot 13. The support foot 13 projects out of the housing 2. The support foot 13 serves to support the cylinder device 1 on the ground when actuated. The piston rod 3 can also be pretensioned inside the housing 2 with a pretensioning element 15, in this case a spring, in the direction of the rest position.

A hydraulic connection 14 is also arranged on the housing 2. If the cylinder device 1 is to be actuated, hydraulic fluid is introduced into an working chamber 16 of the cylinder device 1 via the hydraulic connection 14, for example via a (not shown) power unit or via a pedal-operated pump. This creates a force on an annular surface 17 of the piston rod 3 which, after overcoming the counterforce of the spring 15, moves the piston rod 3 out of the housing 2. As soon as the piston rod 3 has extended so far that the support foot 13 is in contact with the ground, the chassis is lifted as the pressure in the working chamber 16 of the cylinder device 1 continues to increase.

By maintaining the hydraulic pressure in the working chamber 16 of the cylinder device 1, the chassis can be largely held in the desired raised state. In order to detect an imminent lowering of the chassis at an early stage, the cylinder device 1 according to the invention has a distance measuring device which detects a movement of the piston rod 3 relative to the housing 2.

For this purpose, the cylinder device 1 according to the invention comprises a rotary element 4, a movement transmission element 5 and a sensor unit 6 arranged in the cylinder head 7. The rotary element 4 and the movement transmission element 5 have threads 9, 10 engaging in each other and are thereby operatively coupled. In this embodiment, the rotary element 4 has an external thread and the movement transmission element 5 has an internal thread. In particular, the rotary element 4 in this embodiment is configured as a threaded spindle. In this embodiment, the movement transmission element 5 is configured as a threaded nut. However, other configurations are also conceivable, for example in the form of a slotted link guide.

The threaded spindle 4 is rotatably mounted on the cylinder head 7 at its upper end together with a bearing mandrel 11 via a ball bearing. The threaded spindle 4 and the bearing mandrel 11 are firmly connected to each other, for example by press fitting. One end of the bearing mandrel 11 projects into a recess in the threaded spindle 4, which stabilizes the rotary movement of the threaded spindle 4 about the longitudinal axis. An annular washer on the bearing mandrel 11 prevents axial movement of the threaded spindle 4. A sealing arrangement is also provided on the bearing mandrel 11. The cylinder device 1 is divided by the sealing arrangement into a pressurized portion and an unpressurised portion. In the unpressurised portion, the bearing mandrel 11 is connected to the sensor unit 6. The bearing mandrel 11 thus connects the threaded spindle 4 with the sensor unit 6.

The lower end of the threaded spindle 4 projects into a cavity 8 of the piston rod 3. The threaded nut 5 is accommodated in a recess provided for this purpose in the cavity 8 of the piston rod 3. This is firmly connected to the piston rod 3 so that no relative movement is possible between the threaded nut 5 and the piston rod 3. This connection can be made, for example, by fitting a clamping ring and/or by press-fitting. However, other configurations are also possible. For example, the threaded spindle 4 and the threaded nut 5 can be attached to the outside of the piston rod 3, for example in an intermediate space between the piston rod 3 and the housing 2.

If the piston rod 3 is moved axially as a result of pressure being applied, the threaded nut 5, which is firmly connected to it, moves with it. Through the meshing of the threads 9, 10 of the threaded nut 5 and the threaded spindle 4, the axial movement of the threaded nut 5 and the piston rod 3 is translated into a rotary movement of the threaded spindle 4. In other words, when the piston rod 3 is extended and retracted, the threaded nut 5 moves along the longitudinal axis of the threaded spindle 4, which is axially immovable due to the support via the bearing mandrel 11. The threaded spindle 4 is rotated by the axial movement of the threaded nut 5. The amount of rotation of the threaded spindle 4 is proportional to the distance of the axial movement of the piston rod 3. The direction of rotation of the threaded spindle 4 corresponds to either the extension or the retraction movement of the piston rod 3, depending on the direction of rotation of the threads 9, 10.

The rotary movement of the threaded spindle 4 is transmitted to the bearing mandrel 11, which in turn transmits the rotary movement to a rotatable portion 18 of the sensor unit 6. The sensor unit 6 may be an analogue or digital sensor unit. A fixed portion 19 of the sensor unit 6 detects the rotary movement of the rotatable portion. For this purpose, the rotary movement is translated into a rotary increment which is detected via an encoder. The signal is transmitted via a signal line. The distance that the piston rod 3 has travelled can be calculated from the rotary increment using the known thread pitch and direction.

The thread pitch of the two threads 9, 10 is selected in such a way that the frictional forces between the flanks of the threads are low enough to allow the transmission of movement between the threaded nut 5 and the threaded spindle 4 without significantly impairing the outward stroke of the piston rod 3. At the same time, the ratio of the movement transmission must be selected so that the rotary movement of the threaded spindle 4 is large enough to be detected accurately.

The data acquisition can take place during the outward movement of the piston rod 3, during the desired holding of the extended position of the piston rod 3, the so-called immobilization state, and/or during the return movement of the piston rod 3. The data can be acquired continuously during the entire operation of the cylinder device 1 or only at specific times.

The cylinder device 1 according to the invention can monitor the travelled distance of the piston rod 3 and thus the position of the piston rod 3. It can be recorded how far the piston rod 3 has been extended when pressure is applied. This data can be compared with the current position of the piston rod 3 during the immobilization state. If, for example, the piston rod 3 is retracted due to gravity as a result of a pressure loss, this is recorded. The return travel of the piston rod 3 can be compared with predefined tolerances. If the return of the piston rod 3 exceeds the tolerated range, the system can react accordingly, for example with an alarm or a shutdown of the application.

LIST OF REFERENCE SIGNS

1 cylinder device
2 housing
3 piston rod
4 Rotary element/threaded spindle
5 movement transmission element/threaded nut
6 sensor unit
7 cylinder head
8 cavity
9 thread
10 thread
11 bearing mandrel
12 ball bearing
13 support foot
14 hydraulic connection
15 pretension element/spring
16 working chamber
17 annular surface
18 rotatable portion (of the sensor unit)
19 fixed portion (of the sensor unit)

The invention claimed is:

1. A mobile medical device comprising a chassis with a hydraulic lifting device for lifting the chassis, wherein the chassis has castors which come into contact with the ground for moving the chassis on the ground, and wherein the hydraulic lifting device comprises a cylinder device, the cylinder device comprising:

a housing, a piston rod axially movable relative to the housing, and a support foot attached to the piston rod, wherein the support foot is configured to lift the chassis off the ground when the cylinder device is actuated; and a distance measuring device which detects axial movement of the piston rod relative to the housing, wherein the distance measuring device comprises a rotary element, a movement transmission element and a sensor unit;

wherein the rotary element is disposed in the housing in such a way that a rotary movement of the rotary element relative to the housing is possible and an axial movement of the rotary element relative to the housing is prevented;

wherein the piston rod comprises the movement transmission element, the movement transmission element translating an axial movement of the piston rod into a rotary movement of the rotary element; and wherein the sensor unit is attached to the housing and the sensor unit detects the rotary movement of the rotary element which is converted into a distance travelled by the piston rod, wherein an immobilization state of the piston rod is a state in which the piston rod is held in an extended position in which the chassis is lifted from the ground;

wherein the sensor unit detects a retraction of the piston rod during the immobilization state; and wherein the retraction of the piston rod during the immobilization state is compared with predefined tolerances to detect an unintentional lowering of the chassis.

2. The mobile medical device according to claim 1, wherein the housing comprises a cylinder head and the sensor unit is disposed in the cylinder head.

3. The mobile medical device according to claim 1, wherein the movement transmission element is disposed inside the piston rod.

4. The mobile medical device according to claim 1, wherein the rotary element projects into a cavity of the piston rod.

5. The mobile medical device according to claim 1, wherein the rotary element and the movement transmission element have meshing threads.

6. The mobile medical device according to claim 1, wherein the rotary element is a threaded spindle and/or the movement transmission element is a threaded nut.

7. The mobile medical device according to claim 1, wherein the sensor unit is digital or analogue.

8. The mobile medical device according to claim 1, wherein the rotary element is connected to the sensor unit via a bearing mandrel.

9. The mobile medical device according to claim 8, wherein the rotary element and the bearing mandrel are supported via a ball bearing.

10. The mobile medical device according to claim 1, wherein an alarm is issued or an application of the mobile medical device is shut down in reaction to a detected unintentional lowering of the chassis.

\* \* \* \* \*